(12) United States Patent
Bhatnagar et al.

(10) Patent No.: US 11,214,037 B2
(45) Date of Patent: *__Jan. 4, 2022__

(54) LOW POROSITY HIGH STRENGTH UHMW PE FABRICS

(71) Applicant: HONEYWELL INTERNATIONAL INC., Morris Plains, NJ (US)

(72) Inventors: Ashok Bhatnagar, Richmond, VA (US); Huy Xuan Nguyen, Midlothian, VA (US); Lori L. Wagner, Richmond, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,904

(22) Filed: Apr. 15, 2019

(65) Prior Publication Data

US 2019/0240952 A1 Aug. 8, 2019

Related U.S. Application Data

(62) Division of application No. 15/259,833, filed on Sep. 8, 2016, now Pat. No. 10,272,640.

(Continued)

(51) Int. Cl.
*B32B 5/06* (2006.01)
*B32B 27/32* (2006.01)
(Continued)

(52) U.S. Cl.
CPC ............ *B32B 5/06* (2013.01); *B32B 5/022* (2013.01); *B32B 5/024* (2013.01); *B32B 5/08* (2013.01);
(Continued)

(58) Field of Classification Search
None
See application file for complete search history.

(56) References Cited

U.S. PATENT DOCUMENTS 3,365,918 A * 1/1968 Hughes .................. D04B 23/08
66/192
3,565,025 A * 2/1971 Owen, Sr. ................ D04H 1/52
112/420

(Continued)

FOREIGN PATENT DOCUMENTS

CN 101629794 1/2010
JP H06126877 5/1994
(Continued)

OTHER PUBLICATIONS

Machine translation of JP 3268656 which is the equivalent of JPH06128421, Koga et al. (Year: 1994).*

*Primary Examiner* — Shawn Mckinnon
(74) *Attorney, Agent, or Firm* — Roberts & Roberts, LLP; Richard S. Roberts, Jr.

(57) ABSTRACT

Low porosity fibrous materials, articles formed therefrom and processes for their formation. Multiple plies of high tenacity, multifilament elongate bodies are optionally stitched together and pressed as a set without being laminated, adhered or thermally fused to each other. Pressing spreads the component filaments of the elongate bodies, forcing the filaments to occupy spaces between adjacent fibers and thereby reducing porosity of the complete multi-ply material.

20 Claims, 3 Drawing Sheets

Related U.S. Application Data

(60) Provisional application No. 62/219,990, filed on Sep. 17, 2015.

(51) Int. Cl.
    *B32B 5/26* (2006.01)
    *B32B 7/08* (2019.01)
    *B32B 5/02* (2006.01)
    *B32B 5/08* (2006.01)
    *B32B 5/10* (2006.01)

(52) U.S. Cl.
    CPC .............. *B32B 5/10* (2013.01); *B32B 5/26* (2013.01); *B32B 7/08* (2013.01); *B32B 27/32* (2013.01); *B32B 2250/20* (2013.01); *B32B 2262/0253* (2013.01); *B32B 2262/12* (2013.01); *B32B 2307/54* (2013.01); *B32B 2307/554* (2013.01); *B32B 2307/581* (2013.01); *B32B 2307/7265* (2013.01); *B32B 2437/00* (2013.01)

(56) References Cited

U.S. PATENT DOCUMENTS

| | | | |
|---|---|---|---|
| 3,601,873 A * | 8/1971 | Williams | D04H 1/52 |
| | | | 28/169 |
| 3,870,592 A | 3/1975 | Brock et al. | |
| 5,198,280 A * | 3/1993 | Harpell | F41H 1/02 |
| | | | 428/102 |
| 5,536,553 A * | 7/1996 | Coppage, Jr. | B32B 5/26 |
| | | | 428/102 |
| 6,352,022 B1 * | 3/2002 | Lau | D21G 1/006 |
| | | | 100/153 |
| 6,526,862 B1 | 3/2003 | Lyons | |
| 6,642,159 B1 | 11/2003 | Bhatnagar et al. | |
| 6,841,492 B2 | 1/2005 | Bhatnagar et al. | |
| 6,861,378 B2 | 3/2005 | Cunningham et al. | |
| 7,964,518 B1 * | 6/2011 | Bhatnagar | B32B 27/04 |
| | | | 442/134 |
| 9,243,354 B2 | 1/2016 | Tam et al. | |
| 9,243,355 B2 | 1/2016 | Tam et al. | |
| 2001/0027076 A1 | 10/2001 | Tai | |
| 2001/0053645 A1 | 12/2001 | Henderson | |
| 2002/0073473 A1 | 6/2002 | Bachner, Jr. et al. | |
| 2004/0132368 A1 * | 7/2004 | Price | B32B 5/26 |
| | | | 442/247 |
| 2009/0214815 A1 * | 8/2009 | Okada | B29C 70/226 |
| | | | 428/107 |
| 2010/0170386 A1 * | 7/2010 | Bhatnagar | F41H 5/0428 |
| | | | 89/36.02 |
| 2011/0240168 A1 | 10/2011 | Shahkarami | |
| 2012/0186433 A1 | 7/2012 | Braiewa et al. | |
| 2012/0217199 A1 | 8/2012 | Muehlinghaus et al. | |
| 2012/0258301 A1 | 10/2012 | Tam et al. | |
| 2012/0282406 A1 | 11/2012 | Wienke et al. | |
| 2013/0111641 A1 | 5/2013 | Colanto et al. | |
| 2014/0227474 A1 | 8/2014 | Cramer | |
| 2014/0272267 A1 | 9/2014 | Grunden et al. | |
| 2015/0107447 A1 | 4/2015 | Chiou | |

FOREIGN PATENT DOCUMENTS

| | | |
|---|---|---|
| JP | 3268656 | 3/2002 |
| JP | 2007038609 | 2/2007 |

\* cited by examiner

LOW POROSITY HIGH STRENGTH UHMW PE FABRICS

CROSS-REFERENCE TO RELATED APPLICATIONS

This application is a Divisional of co-pending U.S. application Ser. No. 15/259,833, filed Sep. 8, 2016, now U.S. Pat. No. 10,272,640 which issued on Apr. 30, 2019, which claims the benefit of U.S. Provisional Application Ser. No. 62/219,990, filed on Sep. 17, 2015, the disclosures of which are incorporated by reference herein in their entireties.

BACKGROUND

Technical Field

This technology relates to low porosity fibrous materials, articles formed therefrom and processes for their formation.

DESCRIPTION OF THE RELATED ART

High tenacity fibers, such as SPECTRA® polyethylene fibers or aramid fibers such as KEVLAR® fibers, are well known as useful for the formation of high performance articles, such as ballistic and impact resistant articles because of their very high strength to weight performance. Such articles formed from high tenacity fibrous tapes are also known. Articles formed from such high tenacity fibers also exhibit desirable properties such as good wear resistance, cut resistance and slash resistance at low fiber volumes.

For many applications, the fibers or tapes may be formed into woven or knitted fabrics. For other applications, the fibers or tapes may be encapsulated or embedded in a polymeric matrix material and formed into non-woven fabrics, such as unidirectional fabrics or felts. In one common non-woven fabric structure, a plurality of unidirectionally oriented fibers are arranged in a generally coplanar, coextensive relationship and coated with a binding matrix resin to bind the fibers together. Typically, multiple plies of such unidirectionally oriented fibers are merged into a multi-ply composite. See, for example, U.S. Pat. Nos. 4,403,012; 4,457,985; 4,613,535; 4,623,574; 4,650,710; 4,737,402; 4,748,064; 5,552,208; 5,587,230; 6,642,159; 6,841,492; and 6,846,758, all of which are incorporated herein by reference to the extent consistent herewith. Despite the physical strength benefits of articles formed from such high tenacity fibers, these articles tend to have undesirable liquid transmission properties due to high porosity. This is a particular problem with woven fabrics wherein weft fibers are transversely disposed across and between longitudinal warp fibers in an undulating fashion. One way to solve this problem is to seal fabric pores by applying polymeric films or coatings to the fabric surfaces. However, this adds additional complexity to the fabrication process and increases fabric weight, which may be undesirable. Another means to address the problem of liquid transmission through a fabric is to minimize the space between adjacent fibers, such as by adding more fibers to a fibrous layer. However, that too will add weight to a fabric which is typically undesirable. A more preferred method of minimizing space between adjacent fibers is spreading filaments apart to form thinner fiber layers having fewer fibers that lie on top of each other. However, it is difficult to produce thin fabrics with sufficient mechanical integrity to be processed into articles when the filaments of the fibers are spread very thinly, particularly when fabricating unidirectional non-woven fabrics.

One method of addressing this problem of inadequate mechanical integrity during fabrication of unidirectional non-woven fabrics is to use a release paper carrier sheet during processing. In a typical process, an array of unidirectionally oriented parallel fibers is coated with a binder resin and then the coated fibers are contacted with a silicone-coated release paper while the resin is still wet. The coating is then dried and the release paper is removed. However, this method is imperfect because it is desired to avoid the use of a carrier sheet in the manufacturing process and it is also desirable to avoid the need for a binding resin.

U.S. Pat. No. 8,349,112 teaches a method of weaving polymeric tapes together with binding threads, with the polymeric tapes being used as warp yarn and a binding thread being used as weft yarn or with the polymeric tapes being used as weft yarn and a binding thread being used as warp yarn, followed by consolidating multiple layers with sufficient heat to melt the binding threads. The melting deforms the binding threads, distributing the resin around the non-melted polymeric tapes, thereby acting as an adhesive coating. This eliminates the undulations caused by the weaving process. However, this method does not produce articles having less than 10% resin content with sufficient mechanical integrity. U.S. Pat. No. 8,349,112 is silent with regard to binding resin content, but the thermal destruction of the binder fibers compromises the fabric breaking strength in the direction transverse to the polymeric tapes. The melting of the binder fibers also eliminates the mechanical interlocking of warp and weft fibers created by the weaving process, resulting in a non-woven fabric with the binder polymer serving as a conventional adhesive coating. This resulting fabric either has greater than 10% resin content or less than 10% resin content and inadequate mechanical integrity, thereby failing to improve upon prior art composites. Accordingly, U.S. Pat. No. 8,349,112 fails to achieve the objectives of the present disclosure.

U.S. Pat. No. 4,680,213 teaches structures where non-thermoplastic, reinforcing textile yarns are bonded by adhesion with binding yarns disposed transverse to the textile yarns. The reinforcing textile yarns are spaced apart from each other and the binding yarns are spaced apart from each other, so as to form permanent holes in their laminates. This type of open structure is unacceptable for water resistant fabric applications as are desired herein.

Accordingly, there is an ongoing need in the art for lightweight, low porosity woven and non-woven fabrics having good mechanical integrity with low or no binding polymer content and wherein the use of surface polymeric films is optional. The present disclosure provides a solution to this need.

SUMMARY OF THE DISCLOSURE

The disclosure provides a fibrous material comprising:
a first fibrous ply comprising a plurality of first multifilament elongate bodies, wherein at least some of said first multifilament elongate bodies are not connected, bonded or fused to each other, each of said first multifilament elongate bodies having a tenacity of at least about 7 g/denier and an initial tensile modulus of at least about 150 g/denier;
a second fibrous ply on and coextensive with said first fibrous ply, said second fibrous ply comprising a plurality of second multifilament elongate bodies, wherein at least some of said first multifilament elongate bodies are not connected, bonded or fused to each other, each of said second multifilament fibers having a tenacity of at least about 7 g/denier and an initial tensile modulus of at least about 150 g/denier;

wherein said first fibrous ply and said second fibrous ply are not laminated, adhered or thermally fused to each other.

The disclosure also provides a fibrous material comprising:

a first fibrous ply comprising a plurality of first multifilament elongate bodies, each of said first multifilament elongate bodies having a tenacity of at least about 7 g/denier and an initial tensile modulus of at least about 150 g/denier;

a second fibrous ply on and coextensive with said first fibrous ply, said second fibrous ply comprising a plurality of second multifilament elongate bodies, each of said second multifilament fibers having a tenacity of at least about 7 g/denier and an initial tensile modulus of at least about 150 g/denier; and at least a first set of threads interconnecting the first fibrous ply with the second fibrous ply, said first set of threads comprising a plurality of third elongate bodies, wherein said first fibrous ply and said second fibrous ply are not laminated, adhered or thermally fused to each other.

Also provided is a process for forming a fibrous material, the process comprising:

a) providing a first fibrous ply comprising a plurality of first multifilament elongate bodies arranged in a planar, parallel array, each of said first multifilament elongate bodies having a tenacity of at least about 7 g/denier and an initial tensile modulus of at least about 150 g/denier;

b) providing a second fibrous ply comprising a plurality of second multifilament elongate bodies arranged in a planar, parallel array, each of said second multifilament elongate bodies having a tenacity of at least about 7 g/denier and an initial tensile modulus of at least about 150 g/denier;

c) positioning the first fibrous ply coextensively with the second fibrous ply and then optionally mechanically attaching the first fibrous ply and the second fibrous ply to each other, thereby forming a set of plies, wherein at least some of said first multifilament elongate bodies are not connected, bonded or fused to each other; and wherein at least some of said first multifilament elongate bodies are not connected, bonded or fused to each other;

d) thereafter, heating the set of plies to a temperature of from about 270° F. (132.2° C.) to about 302° F. (150.0° C.) and pressing the set of plies together in a press either simultaneously with or subsequent to said heating at a pressure below 500 psi (about 3447 kPa), thereby causing the filaments of said multifilament elongate bodies to spread apart whereby longitudinal edges of adjacent multifilament elongate bodies in each respective fibrous ply are brought into contact with each other; and e) optionally allowing the heated set of plies to cool, wherein said first fibrous ply and said second fibrous ply are not laminated, adhered or thermally fused to each other.

Further provided is a fibrous material comprising a single fibrous ply, said fibrous ply comprising a plurality of multifilament elongate bodies, wherein each of said multifilament elongate bodies have a cross-sectional aspect ratio of at least 2:1, and wherein at least some of said multifilament elongate bodies of said fibrous ply are not connected, bonded or fused to each other.

Still further provided is a reinforced woven fabric consisting essentially of:

I) a single non-woven fibrous ply comprising unidirectionally oriented, high tenacity elongate bodies; or
   a single non-woven fibrous ply comprising a plurality of randomly oriented staple fibers; or
   a single woven fibrous ply comprising a plurality of high tenacity warp elongate bodies interwoven with a plurality of transversely disposed high tenacity weft elongate bodies;

and

II) at least a first set of threads mechanically placed through and reinforcing said single fibrous ply of (I), said first set of threads comprising a plurality of third elongate bodies and forming a plurality of stitches, wherein a plurality of elongate bodies or staple fibers are positioned within each stitch.

Still further provided are multilayer articles formed from said fibrous materials.

DETAILED DESCRIPTION

Figure 2:
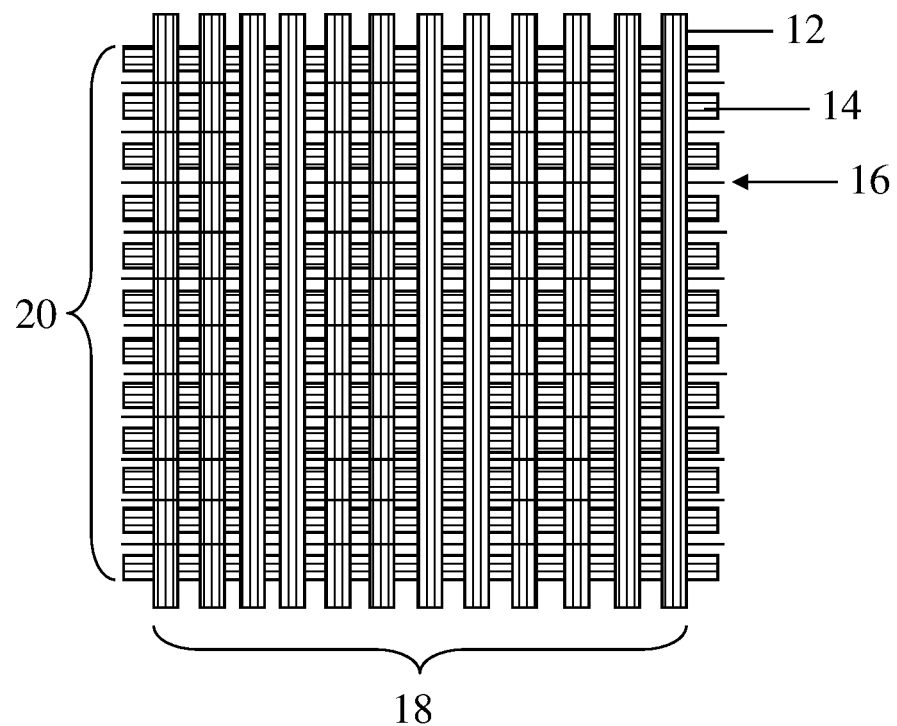
FIG. 2 is a perspective-view schematic representation of a non-woven fibrous material of the disclosure having two fibrous plies interconnected with threads interleaved between groups of high tenacity multifilament elongate bodies.
Figure 3:
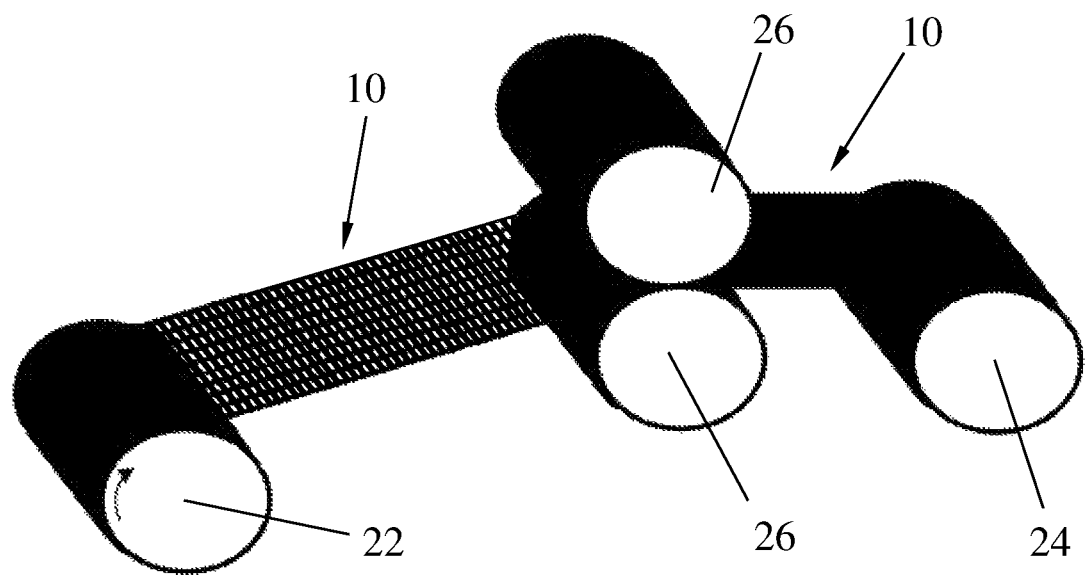
FIG. 3 is a perspective-view schematic representation (not drawn to scale) illustrating the formation of a multi-ply fabric of the disclosure wherein the fibrous plies are pressed together between one set of rolls wherein the multifilament elongate bodies are spread and reduce gaps between adjacent elongate bodies.
Figure 4:
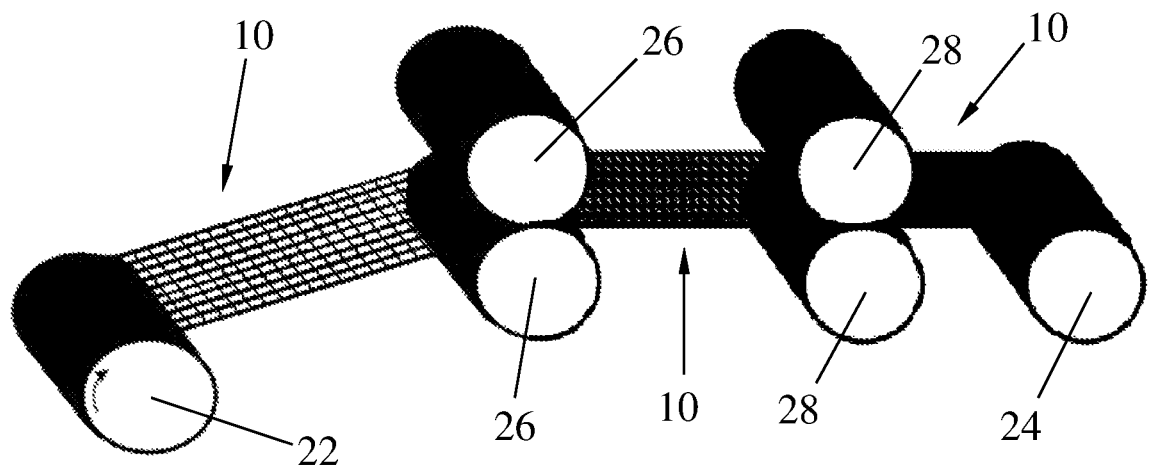
FIG. 4 is a perspective-view schematic representation (not drawn to scale) illustrating the formation of a multi-ply fabric of the disclosure wherein the fibrous plies are pressed together between two sets of rollers wherein and the multifilament elongate bodies are spread and reduce gaps between adjacent elongate bodies.

As illustrated in FIGS. 2-4, multi-ply fibrous materials 10 are fabricated by mechanically attaching together multiple plies of high tenacity elongate bodies with threads, followed by pressing the plies together to spread the filaments of the component elongate bodies such that the spread filaments occupy available space between directly adjacent elongate bodies.

As used herein, "elongate bodies" are bodies having a length dimension that is much greater than the transverse dimensions of width and thickness. Such includes monofilaments (stitching bodies only), untwisted multifilament fibers (i.e. untwisted yarns) that are fused or unfused, twisted multifilament fibers (i.e. twisted yarns) that are fused or unfused, untwisted thermally fused multifilament tape, or non-fibrous polymeric tape (stitching bodies only). In this regard, "fused" refers to the fusion of the individual filaments of a single body to each other.

As used herein, a "fiber" is a long strand of a material, such as a strand of a polymeric material, the length dimension of which is much greater than the transverse dimensions of width and thickness. The fiber is preferably a long, relatively continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section with a cross-sectional aspect ratio of from about 1:1 up to about 2:1. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. A "yarn" is defined as a single strand consisting of multiple filaments, analogous to a multi-filament fiber, but typically (though not necessarily) wherein the filaments are twisted or entangled together. The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

As used herein, a "high tenacity" elongate body is one having a tenacity of at least about 7 g/denier, preferably greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, as measured by ASTM D2256 testing procedures.

Such high tenacity elongate bodies also have an initial tensile modulus of at least about 150 g/denier, more preferably at least about 300 g/denier, more preferably about 400 g/denier or more, more preferably about 500 g/denier or more, still more preferably about 1,000 g/denier or more and most preferably about 1,500 g/denier or more as measured by ASTM D2256 testing procedures. The high tenacity elongate bodies also have an energy-to-break of at least about 8 J/g or more, more preferably at least about 15 J/g or more, more preferably about 25 J/g or more, more preferably about 30 J/g or more and most preferably have an energy-to-break of about 40 J/g or more as measured by ASTM D2256 testing procedures. Methods of forming elongate bodies having these combined high strength properties are conventionally known in the art.

The term "denier" refers to the unit of linear density, equal to the mass in grams per 9000 meters of fiber/tape. In this regard, the elongate bodies forming each fibrous ply may be of any suitable denier. For example, fibers may have a denier of from about 50 to about 5000 denier, more preferably from about 200 to 5000 denier, still more preferably from about 300 to about 3000 denier, and most preferably from about 350 to about 1000 denier.

As used herein, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. Known tapes may be fibrous or non-fibrous, wherein a "fibrous" tape comprises one or more filaments. However, consistent with the objectives of the disclosure, only fibrous tapes are useful herein such that the component filaments are spread during compression as discussed below. The cross-section of a polymeric tape of the disclosure may be rectangular, oval, polygonal, irregular, or of any shape satisfying the width, thickness and aspect ratio requirements outlined herein.

Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 μm), more preferably from about 0.35 mil (8.89 μm) to about 3 mils (76.2 μm), and most preferably from about 0.35 mil to about 1.5 mils (38.1 μm). Thickness is measured at the thickest region of the cross-section.

Polymeric tapes useful herein have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the polymeric tapes formed herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred polymeric tapes have an average cross-sectional aspect ratio of at least about 400:1.

Tapes are formed by conventionally known methods. For example, a fabric may be cut or slit into tapes having a desired length. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 are incorporated herein by reference to the extent consistent herewith.

Particularly useful methods for forming fibrous tapes are described in commonly-owned U.S. Pat. Nos. 8,263,119; 8,697,220; 8,685,519; 8,852,714; 8,906,485, each of which is incorporated herein by reference to the extent consistent herewith; as well as the fibrous and non-fibrous tapes described in commonly-owned U.S. pre-grant publications 2013-0101787 and 2014-0260933, each of which is incorporated herein by reference to the extent consistent herewith. Like fibers, the tapes may be of any suitable denier, preferably having a denier of from about 50 to about 30,000, more preferably from about 200 to about 10,000 denier, still more preferably from about 650 to about 2000 denier, and most preferably from about 800 to about 1500 denier.

A "fibrous ply" as used herein comprises any type of uni-axial or multi-axial fabric, including a single-ply of unidirectionally oriented or randomly oriented (i.e. felted) non-woven fibers or a single-ply of woven fabric. In this regard, a "ply" describes a generally planar arrangement having an outer top (first) planar surface and an outer bottom (second) planar surface. A single ply of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes structures that may include one or more fiber plies, with or without consolidation/molding of the plies.

A non-woven fabric formed from a plurality of non-woven fiber plies comprises plies that are stacked on each other surface-to-surface in a substantially coextensive fashion and consolidated. The term "composite" refers to combinations of fibers, optionally with a polymeric binder material.

The high tenacity elongate bodies may comprise fibers or tapes formed from any conventionally known polymer type having a tenacity of at least about 7 g/denier and an initial tensile modulus of at least about 150 g/denier. Particularly suitable are elongate bodies formed from polyolefins, including polyethylene and polypropylene; polyamide fibers including aramid fibers, particularly para-aramid fibers; polyesters, including polyethylene terephthalate, polypropylene terephthalate, and polybutylene terephthalate; polyphenylenesulfide; extended chain polyvinyl alcohol; extended chain polyacrylonitrile; gel spun polytetrafluoroethylene (PTFE); polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Particularly preferred are extended chain polyolefin elongate bodies, such as highly oriented, high molecular weight polyethylene, particularly ultra-high molecular weight polyethylene (UHMW PE) elongate bodies, and ultra-high molecular weight polypropylene elongate bodies. Each of these elongate body types described above is conventionally known in the art. Also suitable for producing polymeric elongate bodies are copolymers, block polymers and blends of the above materials. For example, useful elongate bodies may be formed from multi-filament elements comprising at least two different filament types, such as two different types of UHMW PE filaments or a blend of polyester filaments and UHMW PE filaments.

Specifically most preferred are elongate bodies formed from ultra high molecular weight polyethylene. Ultra high molecular weight polyethylene filaments, fibers, yarns and tapes are formed from extended chain polyethylenes having molecular weights of at least 300,000, preferably at least one million and more preferably between two million and five million. Such extended chain polyethylene fibers/tapes may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference to the extent consistent with the present disclosure. Particularly preferred fiber types are any of the polyethylene fibers sold under the trademark SPECTRA® from Honeywell International Inc, including SPECTRA® 900 fibers, SPECTRA® 1000 fibers and SPECTRA® 2000 fibers, all of which are commercially available from Honeywell International Inc. of Morristown, N.J.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" processes, also referred to as "solution spinning," wherein a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

The most preferred UHMW PE fibers have an intrinsic viscosity when measured in decalin at 135° C. by ASTM D1601-99 of from about 7 dl/g to about 40 dl/g, preferably from about 10 dl/g to about 40 dl/g, more preferably from about 12 dl/g to about 40 dl/g, and most preferably, from about 14 dl/g to 35 dl/g. The most preferred UHMW PE fibers are highly oriented and have a c-axis orientation function of at least about 0.96, preferably at least about 0.97, more preferably at least about 0.98 and most preferably at least about 0.99. The c-axis orientation function is a description of the degree of alignment of the molecular chain direction with the filament direction. A polyethylene filament in which the molecular chain direction is perfectly aligned with the filament axis would have an orientation function of 1. C-axis orientation function ($f_c$) is measured by the wide angle x-ray diffraction method described in Correale, S. T. & Murthy, Journal of Applied Polymer Science, Vol. 101, 447-454 (2006) as applied to polyethylene.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

When it is desired to utilize twisted elongate bodies, various methods of twisting fibers/yarns are known in the art and any method may be utilized. In this regard, twisted multi-filament tapes are preferably formed by first twisting a feed fiber/yarn precursor, followed by compressing the twisted precursor into a tape. Useful twisting methods are described, for example, in U.S. Pat. Nos. 2,961,010; 3,434, 275; 4,123,893; 4,819,458 and 7,127,879, the disclosures of which are incorporated herein by reference. The fibers/yarns are twisted to have at least about 0.5 turns of twist per inch of fiber/yarn length up to about 15 twists per inch, more preferably from about 3 twists per inch to about 11 twists per inch of fiber/yarn length. In an alternate preferred embodiment, the fibers/yarns are twisted to have at least 11 twists per inch of fiber/yarn length, more preferably from about 11 twists per inch to about 15 twists per inch of fiber/yarn length. The standard method for determining twist in twisted yarns is ASTM D1423-02.

When it is desired to utilize fused elongate bodies, various methods of fusing fibers/yarns are known in the art and any method may be utilized. As with twisting, fused multi-filament tapes are preferably formed by first fusing a feed fiber/yarn precursor followed by compressing the fused precursor into a tape. In this regard, fusion of the fiber/yarn filaments may be accomplished by with the use of heat and tension, or through application of a solvent or plasticizing material prior to exposure to heat and tension as described in U.S. Pat. Nos. 5,540,990; 5,749,214; and 6,148,597, which are hereby incorporated by reference to the extent consistent herewith. Fusion by bonding may be accomplished, for example, by at least partially coating the filaments with a resin or other polymeric binder material having adhesive properties, such as a polystyrene-polyisoprene-polystyrene-block copolymer resin commercially available from Kraton Polymers of Houston, Tex. under the trademark KRATON® D1107, or any other adhesive polymer described herein. The filaments forming an individual elongate body may also be thermally bonded together without an adhesive coating. Thermal bonding conditions will depend on the fiber type. When the feed fibers/yarns are coated with a resin or other polymeric binder material having adhesive properties to bond the filaments, only a small amount of the resin/binder is needed. In this regard, the quantity of resin/binder applied is preferably no more than 5% by weight based on the total weight of the filaments plus the resin/binder, such that the filaments comprise at least 95% by weight of the coated fiber/yarn based on the total weight of the filaments plus the resin/binder, and the corresponding tape formed from the yarn will thereby also comprise at least 95% by weight of the component filaments. More preferably, the fibers/yarns and tapes comprise at least about 96% filaments by weight, still more preferably 97% filaments by weight, still more preferably 98% filaments by weight, and still more preferably 99% filaments by weight. Most preferably, the fibers/yarns and compressed tapes formed therefrom are resin-free, i.e. are not coated with a bonding resin/binder, and consist essentially of or consist only of filaments. Also, the multifilament tapes of the disclosure are most preferably non-fused so that their component filaments may be spread at lower pressures.

The fibers or tapes forming each fibrous ply of the disclosure are optionally, but not preferably, partially or fully coated with a polymeric binder material. The polymeric binder material is also commonly referred to in the art as a polymeric "matrix" material. These terms are conventionally known in the art. As used herein, a "polymeric" binder or matrix material includes resins and rubber. When present, the polymeric binder/matrix material either partially or substantially coats the individual fibers, optionally fully encapsulating each of the individual filaments/fibers forming a fiber ply. However, it is most preferred that the fibrous materials of the disclosure are entirely matrix-free (binder-free). When a polymeric binder/matrix material is used, it comprises not more than 10% by weight of the fibrous material, preferably no greater than 5%, more preferably no greater than 4% by weight of the fibrous material, more preferably no greater than 3% by weight of the fibrous material, more preferably no greater than 2% by weight of the fibrous material, and most preferably no greater than 1% by weight of the fibrous material. When used, this resin may aid in filling a minimal space between fibers/tapes that may be created by the stitching process discussed below.

Suitable polymeric binder materials are exclusively low tensile modulus, elastomeric materials. As used herein throughout, the term tensile modulus means the modulus of elasticity, which for polymeric binder materials is measured by ASTM D638. A low modulus binder may comprise a variety of polymeric and non-polymeric materials. For the purposes of this invention, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (about 3447 kPa) (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. The polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R\text{-}(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Dusseldorf, Germany. Conventional low modulus polymeric binder polymers employed in ballistic resistant composites include polystyrene-polyisoprene-polystyrene block copolymers sold under the trademark KRATON® commercially produced by Kraton Polymers.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

Methods for applying a polymeric binder material to fibers to thereby impregnate fibrous materials (fibrous material plies/layers) with the binder are well known and readily determined by one skilled in the art. The term "impregnated" is considered herein as being synonymous with "embedded," "coated," or otherwise applied with a polymeric coating where the polymeric material diffuses into the fiber ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

The disclosure provides three primary embodiments: 1) a non-woven fibrous material comprising at least two non-woven fibrous plies of high tenacity fibers that are optionally stitched together; 2) a woven fibrous material comprising at least two woven fibrous plies of high tenacity fibers that are optionally stitched together; and 3) a fibrous material comprising a single fibrous ply that is reinforced with threads, such as stitches, which single fibrous ply may be of any woven or non-woven construction, including felts. In each of these embodiments, at least some of the multifilament elongate bodies forming each individual fibrous ply are not connected, bonded or fused to each other, and preferably, mechanical attachment, such as stitching, is the sole means of attaching multiple plies together.

Figure 1:
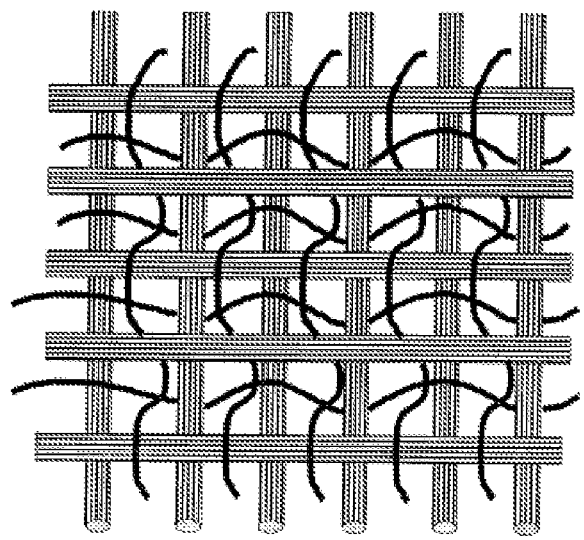
FIG. 1 is a perspective-view schematic representation of a non-woven fibrous material of the prior art having a first fibrous ply of high tenacity multifilament fibers in a longitudinal direction, a second fibrous ply of high tenacity multifilament fibers transversely disposed across the longitudinal bodies in a lateral direction, and threads interleaved with the high tenacity multifilament elongate bodies interconnecting said two fibrous plies.

Illustrated in FIG. 1 is an embodiment from commonly-owned U.S. Pat. Nos. 6,841,492 and 7,073,538 showing a first fibrous ply of unidirectional high tenacity fibers positioned as longitudinally extending bodies and a second fibrous ply of unidirectional high tenacity fibers transversely disposed below and laterally across the fibers of the first fibrous ply. As further illustrated, the first fibrous ply and second fibrous ply are stitched together and thereby interconnected with stitching threads. As shown, the stitching threads are interleaved through the two plies with periodic cross-overs such that only a single fiber is positioned within each stitch such that each individual fiber of a layer is held in place by a single stitch. This is contrasted with the present disclosure wherein at least some of the multifilament elongate bodies forming each fibrous ply are not connected, bonded or fused to each other. This is illustrated in FIG. 2 of the present disclosure wherein a first fibrous ply 18 comprising, consisting of or consisting essentially of unidirectional high tenacity elongate bodies 12 positioned as longitudinally extending bodies is stitched together with and a second fibrous ply 20 comprising, consisting of or consisting essentially of unidirectional high tenacity elongate bodies 14 that are transversely disposed below and laterally across the bodies 12 of first fibrous ply 18. As shown in the figure, at least two immediately adjacent elongate bodies 12 are positioned within each stitch of a first set of threads 16, such that immediately adjacent bodies 12 within each stitch are not connected, bonded or fused to each other such that they are not constrained relative to each other and are therefore able to move freely when compressed, particularly under the conditions described below, to allow for enhanced filament spreading under compression. A second set of threads (not shown) may be similarly interleaved through the plies in an orthogonal direction to threads 16, wherein at least two adjacent elongate bodies 14 (i.e., at least two ends) are positioned within each stitch of said second set of threads. In the preferred embodiments, at least three elongate bodies (i.e., at least three ends) are positioned within each stitch, more preferably at least four elongate bodies, still more preferably at least 5 elongate bodies (ends), still more preferably at least 6 elongate bodies (ends), still more preferably at least 7 elongate bodies (ends), still more preferably at least 8 elongate bodies (ends), still more preferably at least 9 elongate bodies (ends), and most preferably at least 10 elongate bodies (ends) are positioned within each stitch. By increasing the number of elongate bodies within each stitch, greater filament/fiber spreading is achieved through pressing the fabric under the conditions described below, which thereby minimizes the porosity of the resulting fibrous material. The fibrous layers may be stitched at regular or irregular intervals and the number of filaments within each stitch may be equal to each other or may vary. FIG. 2 illustrates an embodiment including stitches at regular intervals wherein each stitch includes two elongate bodies 12. In this embodiment of FIG. 2, six total stitches are shown for each thread 16 across twelve total elongate bodies 12. Together these plies form a single non-woven fibrous layer. A plurality of these fibrous layers may be adjoined to form a multilayer article.

A non-woven unidirectional fibrous ply of this disclosure may be formed by conventional methods in the art. For example, in a preferred method of forming a non-woven unidirectional fibrous ply, a plurality of elongate bodies are arranged into an array, typically being arranged as a fiber web comprising a plurality of bodies aligned in a substantially parallel, unidirectional array. In a typical process, multifilament fibers, fiber bundles including multiple fibers or multifilament tapes are supplied from a creel and led through guides and one or more spreader bars into a collimating comb. In a conventional process, this is followed by coating the fibers with a polymeric binder material, but this step is optional for the purposes of the present disclosure. A fiber bundle or multifilament tape may have from about 30 to about 2000 individual filaments. The spreader bars and collimating comb disperse and spread out the fibers and/or their component filaments, reorganizing them side-by-side in a coplanar fashion.

Alternatively, the non-woven fibrous plies may be felts. A felt is a non-woven network of randomly oriented fibers, preferably being formed from discontinuous fibers such as staple fibers having a length ranging from about 0.25 inch (0.64 cm) to about 10 inches (25.4 cm). Felts may be formed by any of several well known techniques known in the art, such as by carding or fluid laying, melt blowing and spin laying.

In accordance with the present disclosure, at least a first non-woven fibrous ply and a second non-woven fibrous ply are formed according to such conventional means in the art. Thereafter, the first fibrous ply is positioned coextensively with the second fibrous ply, and any additional plies as desired, so that the plies are stacked on top of each other coextensively. In preferred embodiments, when the first and second fibrous plies are non-woven unidirectional plies, it is preferred that the plies are oriented at 0°/90° or +45°/−45° angles relative to their respective longitudinal axes of their component elongate bodies. This is known to achieve strong dimensional stability in a multilayer fibrous material. Thereafter, the first fibrous ply and the second fibrous ply are preferably stitched together according to conventional means in the art with at least a first set of threads to thereby form a set of plies. This set of plies will then be pressed as discussed below without causing the plies to be laminated, adhered or fused or otherwise adhesively or thermally bonded to each other.

In the second primary embodiment, a woven fibrous material is formed by fabricating at least two woven fibrous plies of high tenacity fibers by conventional methods in the art wherein the woven plies are preferably subsequently stitched together. Woven fabrics may be formed using any well known fabric weave, such as plain weave, crowfoot weave, basket weave, satin weave, twill weave, three dimensional woven fabrics, and any of their several variations. Plain weave is most common, wherein fibers (or tapes) are woven together in an orthogonal 0°/90° orientation with warp fibers oriented perpendicular to weft (fill) fibers. This method is preferred herein. In a woven fabric, the warp and weft (fill) count, known in the art as a "pick count" or "mesh count," is a measure of the density of the woven fabric. Plain weave fabrics may have an equal or unequal warp and weft count. In this regard, preferred first fibrous materials have a preferred pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. Preferred second fibrous materials have a preferred pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions. These ends-per-inch ranges are for the unpressed woven materials and are also preferred for un-pressed unidirectional non-woven fabrics.

In accordance with the present disclosure, at least a first woven fibrous ply and a second woven fibrous ply are formed according to such conventional means in the art. Thereafter, the first fibrous ply is positioned coextensively with the second fibrous ply, and any additional plies as desired, so that the plies are stacked on top of each other coextensively. Thereafter, the first fibrous ply and the second fibrous ply are preferably stitched together according to conventional means in the art with at least a first set of threads to thereby form a set of plies. This set of plies will then be pressed as discussed below without causing the plies to be laminated, adhered or fused or otherwise adhesively or thermally bonded to each other.

The third primary embodiment of the disclosure is similar to each of the first and second embodiments of the disclosure except that it only includes a single fibrous ply that is preferably reinforced by at least a first set of threads placed through the ply, such as by stitching or sewing. Most preferably, such single ply structures are woven fabrics. This single ply structure is particularly advantageous in forming lightweight articles such as backpacks, bags and the like, where low porosity is desired. In this embodiment, whether stitched or not stitched, each of said multifilament elongate bodies have a cross-sectional aspect ratio of at least 2:1, and wherein at least some of said multifilament elongate bodies of said fibrous ply are not connected, bonded or fused to each other.

While these primary embodiments described above are most preferred, various other embodiments are within the disclosure provided that in any multiple fibrous ply fabric the component plies are not laminated, adhered or fused or otherwise adhesively or thermally bonded to each other. For example, a multi-ply fibrous material of the disclosure may comprise a hybrid combining one or more woven fibrous plies with one or more non-woven fibrous plies. In an alternate example, the fabrics of the disclosure may be formed with elongate bodies comprising low tensile strength fibers or tapes rather than high tenacity fibers or tapes, or with a combination of high tenacity elongate bodies and low tenacity elongate bodies (e.g. a first ply of high tenacity bodies stitched together with a second ply of low tenacity bodies, or wherein each ply comprise a combination of low tenacity and high tenacity bodies). In this regard, as used herein, a "low tenacity fiber" is one which has a tenacity of less than 7 g/denier. The first fibrous material is formed from fibers having a lower tensile strength than the fibers forming the second fibrous material. Exemplary low tenacity fibers non-exclusively include nylon fibers, polyester fibers, polypropylene fibers, low tenacity polyolefin fibers, or a combination thereof. Preferred are nylon fibers, including low denier nylon fibers (approximately 30-100 denier) and high denier nylon fibers (approximately 400-1500 denier). Particularly preferred are nylon fibers having a denier of from 400 to 2000 denier, more preferably from about 500 to about 1500 denier, and most preferably from about 500 to about 1000 denier.

Once all the desired individual fibrous plies are formed, all the plies are overlapped on top of each other coextensively to form a stack, followed by optionally mechanically attaching the plies to each other, such as by stitching or by needle punching the fibrous plies together in the z-direction. Felted fibrous plies may be consolidated mechanically by stitching or needle punching, but may also be formed on other layers (woven, UD non-woven or felted non-woven) by known means such as hydro-entanglement, air entanglement, spin lacing or the like. Of these, the preferred methods are stitching or needle punching.

In accordance with the disclosure, any conventionally known method of stitching may be used in all embodiments of the disclosure using any useful stitching bodies, provided that at least two elongate bodies (ends) are positioned within each stitch. Useful stitching bodies non-exclusively include all of the fibers and tapes described herein as useful for forming the high tenacity fibrous plies, particularly high strength SPECTRA® UHMWPE fibers, as well as low tenacity fibers, such as nylon fibers. While any conventional method of stitching is useful herein, particularly preferred are the stitching techniques and stitching threads described in commonly-owned U.S. Pat. Nos. 6,841,492 and 7,073,538, which are incorporated herein by reference to the extent consistent herewith, provided that stitching is conducted to position at least two elongate bodies (ends) within each stitch. Like described in these patents, in the present disclosure two separate sets of threading yarns may be interleaved with first and second plies of fibers, with one set of threading yarns being arranged transverse to and interleaved with the elongate bodies of the first ply and the second set of threading yarns being arranged transverse to and interleaved with the elongate bodies of the second ply.

As in U.S. Pat. Nos. 6,841,492 and 7,073,538, it is most preferred herein that the elongate bodies forming the first fibrous ply and the second fibrous ply have a tenacity of at least twice the tenacity of the elongate bodies of each set of threads (i.e. referred to herein as the third elongate bodies) which interconnect the first fibrous ply with the second fibrous ply, and that the elongate bodies forming the first fibrous ply and the second fibrous ply have at most about one-half the elongation-to-break percent of said third elongate bodies. These third elongate bodies serve to hold the bodies of the first and second fibrous plies in position prior to compression. Under compression, the third elongate bodies will be stretched as the transversely disposed first and/or second elongate bodies, respectively, are spread. The high elongation-to-break prevents the threads from breaking while permitting their stretching to facilitate filament spreading of the higher tenacity elongate bodies and while maintaining mechanical integrity of the interconnected set of plies. In a ballistic resistant composite, this is also beneficial for the reasons stated in U.S. Pat. Nos. 6,841,492 and 7,073,538.

Preferred third elongate bodies include those disclosed in U.S. Pat. Nos. 6,841,492 and 7,073,538, including fibers formed from polyamides, polyesters, polyvinyl alcohol, polyolefins, polyacrylonitrile, polyurethane, cellulose acetate, cotton, wool, and copolymers and blends thereof. Most preferably, the third elongate bodies are selected from the group consisting of nylon 6, nylon 66, polyethylene terephthalate (PET), polyethylene naphthalate, (PEN), polybutylene terephthalate (PBT), polytrimethylene terephthalate (PTT), polypropylene, polyvinyl alcohol and polyurethane. Particularly preferred are polyvinyl alcohol fibers and polyurethane fibers. Suitable polyurethane fibers are those known in the art as elastane fibers or spandex fibers, which are commercially available, for example, from DuPont under the brand name LYCRA®. The third elongate bodies may be comprised of elastomeric fibers or staple fibers.

In accordance with the disclosure, after the multiple fiber plies are optionally mechanically interconnected through the desired means to form a set of plies, the set of plies is pressed at a high temperature, i.e. from about 270° F. (132.2° C.) to about 302° F. (150.0° C.), while most preferably being maintained at a low pressure, i.e. no greater than 500 psi (about 3447 kPa). Greater filament spreading is achievable at high temperatures than at low temperatures, but higher temperatures have been known to degrade the fibers and reduce their tensile properties. For ultra high molecular weight polyethylene fibers in particular, which have a melting point of approximately 130° C. to 136° C. (266° F. to 276.8° F.), it was previously believed that the fibers would degrade when heated above 130° C. However, it has now been unexpectedly found that UHMWPE fibers may be effectively spread at temperatures up to about 150° C. when they are constrained, preferably continuously such as by being under constant tension, and pressed at a low pressure, i.e., heated while under tension and being compressed under a compression pressure of no more than 500 psi (about 3447 kPa), without losing orientation of the molecular chains and deteriorating the fiber/tape tensile properties. Higher compression pressures above 500 psi, such as from 500 psi to 1000 psi or up to 1000 psi, or greater than 1000 psi, may optionally be used to achieve fiber spreading but at greater pressures the risk of fiber degradation increases and best results are achieved below 500 psi, more preferably below 400 psi, more preferably below 300 psi and most preferably below 250 psi. The enhanced filament spreading achieved by this method effectively minimizes spacing between adjacent elongate bodies, particularly when a plurality of adjacent bodies are not connected to each other and are capable of moving freely within the fibrous ply, thereby enabling the fabrication of a fibrous material having very low or no porosity. The low pressure also prevents the fibrous plies from fusing or otherwise bonding to each other, which further facilitates enhanced filament spreading.

FIG. 3 and FIG. 4 illustrate two preferred methods of compressing the fibers. In the method of FIG. 3, the set of fibrous plies 10 is unwound from a first storage roll 22 and pressed between a first set of heated tension rolls 26 wherein the multifilament elongate bodies are spread and reduce gaps between adjacent elongate bodies, forming a low or no porosity material as shown. The low/no porosity material is then rewound on a second storage roll 24. FIG. 4 illustrates an embodiment that employs a second set of heated tension rolls 28 prior to rewinding the material onto storage roll 24, such that the fibrous material is pressed twice prior to rewinding. The heated tension rolls are preferably heated to a temperature of from about 270° F. (132.2° C.) to about 302° F. (150.0° C.), more preferably from about 280° F. (137.8° C.) to about 302° F. (150° C.), and most preferably from about 290° F. (143.3° C.) to about 302° F. (150° C.). The most suitable temperature will vary depending on the melting point of the polymer used to form the high tenacity elongate bodies. The heated rolls exert pressure on the interconnected fibrous plies, pressing the plies at a pressure of from about 50 psi (344.7 kPa) to about 500 psi (3447 kPa), more preferably from about 200 psi (1379 kPa) to about 500 psi (3447 kPa), still more preferably from about 300 psi (2068 kPa) to about 500 psi (3447 kPa) and most preferably from about 400 psi (2758 kPa) to about 500 psi (3447 kPa).

The rate at which the fibrous material passes through the rolls will be determined by one skilled in the art but will typically be at a rate of from about 1 meter/minute to about 100 meters/minute, more preferably from about 2 meters/minute to about 50 meters/minute, still more preferably from about 3 meters/minute to about 50 meters/min, still more preferably from about 4 meters/minute to about 30 meters/minute, and most preferably from about 5 meters/minute to about 20 meters/minute. The selected rate, pressure and temperature must be sufficient to prevent the first fibrous ply and said second fibrous ply from being laminated, adhered or thermally fused to each other so that fiber spreading is maximized. These embodiments are exemplary only and additional heated or unheated tension rolls may be employed as determined by one skilled in the art. The interconnected fibrous plies may also be passed through rolls 26 or rolls 26 and 28 multiple times until the desired degree of filament spreading is achieved. The pressed fibrous material is preferably cooled to below 130° C. before being wound onto second storage roll 24.

Figure 5:
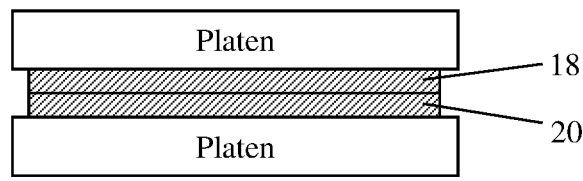
FIG. 5 is a side-view schematic representation (not drawn to scale) illustrating the compression of first and second fibrous plies in a platen press.

Alternative compression means may also be suitable as determined by one skilled in the art while maintaining the specified temperature and pressure ranges. For example, the set of interconnected fibrous plies may be compressed in a conventional platen press between two heated platens, as illustrated in FIG. 5. In this embodiment, the platens are preferably heated at a temperature of up to 150.0° C. and a pressure of up to about 500 psi (about 3447 kPa). Suitable residence times in the platen press would be determined by on skilled in the art but will typically range from about 30 seconds to about 3 minutes. The residence time is sufficient to prevent the first fibrous ply and said second fibrous ply from being laminated, adhered or thermally fused to each other so that fiber spreading is maximized.

Pressing the multifilament fibers or tapes under the above conditions causes the filaments to spread apart laterally, flattening the elongate bodies into thinner structures wherein they are reduced in thickness and increased in width. In this regard, where the elongate bodies are multifilament fibers, the fibers prior to pressing are referred to herein as precursor fibers having an aspect ratio of $AR_i$ and the fibers after pressing are referred to herein as final fibers having an aspect ratio of $AR_f$. Precursor fibers of the first fibrous ply have an aspect ratio of $1AR_i$ and the pressed final fibers have an aspect ratio of $1AR_f$, precursor fibers of the second fibrous ply have an aspect ratio of $2AR_i$ and the pressed final fibers have an aspect ratio of $2AR_f$, etc. In the preferred embodiments of the disclosure, when the fibrous plies are formed from multifilament fibers, in the pressed fibrous material each of the first and second multifilament fibers, and the multifilament fibers of each optional additional ply, preferably has an $AR_f$ of at least 2:1. More preferably, in each of the fibrous plies comprising multifilament fibers, each of the multifilament fibers has an $AR_f$ (aspect ratio after pressing) of at least two times the $AR_i$ (aspect ratio before pressing). Still more preferably, the multifilament fibers of each fibrous ply have an $AR_i$ of from about 1:1 to about 2:1 and an $AR_f$ of from about 2:1 to about 4:1. Still more preferably, the $AR_f$ is at least five times $AR_i$ for each of the multifilament fibers, and most preferably $AR_i$ is from about 1:1 to about 2:1 and $AR_f$ is greater than about 10:1 for each of the multifilament fibers of each fibrous ply.

When the elongate bodies are fibrous tapes, the multifilament fibrous tapes are referred to herein as having a cross-sectional aspect ratio before pressing of $AR_{it}$ and after pressing of $AR_{ft}$. The $AR_{it}$ of each tape is at least 3:1 which is preferably at least doubled by pressing to achieve an $AR_{ft}$ of at least 6:1. More preferably, the $AR_{ft}$ of each fibrous tape is at least five times the $AR_{it}$.

In the most preferred embodiments, the fibers are sufficiently spread to eliminate space between the bodies such that no gaps are present between immediately adjacent multifilament elongate bodies, thereby reducing porosity of the fibrous material as much as possible. If desired, such as if water penetration resistance is required, the barrier properties of the fibrous material may also be supplemented by applying a polymer film to one or each of the surfaces of the first fibrous ply and/or the second fibrous ply, and/or any additional fibrous plies, after the pressing/compression step. In these embodiments, particularly preferred polymer films non-exclusively include thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Such thermoplastic polymer layers are preferably very thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present invention. Such thermoplastic polymer layers may be bonded to the composite surfaces using well known techniques, such as thermal lamination, before, during or after merging together the individual fiber plies or fibrous material layers. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may also optionally be bonded to the composite surfaces with hot glue or hot melt fibers as would be understood by one skilled in the art. Additionally, as an alternative to a polymeric film, one or more surfaces of a fibrous material layer may be coated with protective coating, such as a coating providing water repellent properties. Suitable coatings non-exclusively include natural rubber, polyvinyl chloride, polyurethane, silicone elastomers, fluoropolymers, and waxes, as would be determined by one skilled in the art. Particularly preferred water resistant polymer coatings non-exclusively include fluoropolymer based coatings, such as OLEOPHOBOL™ water repellent agents commercially available from Huntsman LLC of Salt Lake City, Utah, and polyurethane coatings.

The no/low porosity fibrous materials formed herein preferably have low areal densities, making them more useful in industrial applications than in armor applications. In preferred embodiments, the no/low porosity fibrous materials of the disclosure have an areal density of from about 0.1 lb/ft$^2$ (psf)(0.488 kg/m$^2$)(ksm) to about 1.0 psf (4.88 ksm), more preferably from about 0.2 psf to about 0.9 psf (0.4.392 ksm), still more preferably from about 0.3 psf (1.464 ksm) to about 0.8 psf (3.904 ksm), and most preferably from about 0.4 psf (1.952 ksm) to about 0.6 psf (2.928 ksm).

The resulting no/low porosity fibrous materials of the disclosure are useful in a wide range of applications, but are particularly useful for the fabrication of lightweight, non-armor articles where abrasion resistance and no/low porosity is desired, such as air bags, air curtains, marine fabrics, sailcloth, roofing, awnings, banners, flags, canopies, flooring materials, bedding, curtains, furniture, tents, parachutes, tarps, sleeving, landscaping materials, drainage and erosion control materials, conveyor belts, pressure-sensitive adhesive tape, luggage, backpacks, equipment bags, outdoor wear such as raincoats and wind breakers, active wear such as ski apparel, cycling apparel and swimwear, military garments, work gear, shoes, boots, etc.

The following non-limiting examples serve to illustrate preferred embodiments of the disclosure:

EXAMPLE 1

Two woven fabric plies (plain weave) of 1200 denier, SPECTRA® S900 ultra-high molecular weight polyethylene fibers are provided, each fabric having a pick count of 21×21 ends per inch and a fiber areal density of 7 oz./yd$^2$. Neither fabric is coated with a polymeric binder, i.e., the fiber content is 100%. The fabrics are cut to have dimensions of 40 cm×40 cm and the plies are then stacked on each other coextensively and placed centrally between two 45 cm×45 cm steel plates covered with release paper. The steel plates are transferred to a heated hydraulic press having platens kept at 138° C. The press is closed and a 15 bar pressure is applied for 15 minutes. After 15 minutes, the press is switched to a cooling cycle by switching to chilled water. Once the press platens reach 65° C., the press is opened, the steel plates are removed and the fabric sample is released. The resulting fabric has closed gaps between the fibers and also provides sufficient durability for using it as-is or for secondary processing, but the plies are not laminated, adhered or thermally fused to each other.

EXAMPLE 2

One ply of the woven SPECTRA® S900 fabric of Example 1 is provided. Also provided is one woven fabric ply (plain weave) of 375 denier, SPECTRA® 1000 ultra-high molecular weight polyethylene fibers (54×54 ends per inch, 2.9 oz/yd$^2$ fiber areal density). Neither fabric is coated with a polymeric binder, i.e., the fiber content is 100%. Each fabric ply is cut to have dimensions of 40 cm×40 cm and they are stitched together with yarn in a square pattern (1"×1" grid) with polyamide (nylon 6) fibers. The plies are then stacked on each other coextensively and placed centrally between two 45 cm×45 cm steel plates covered with release paper and pressed under the same conditions as in Example 1. The resulting fabric product has closed gaps between the two styles of SPECTRA® fabric and also provides sufficient durability for using it as-is or for secondary processing, but the plies are not laminated, adhered or thermally fused to each other.

EXAMPLE 3

One ply of the woven SPECTRA® S900 fabric of Example 1 is provided. Also provided is one non-woven felt ply of randomly oriented 1200 denier, SPECTRA® S900 ultra-high molecular weight polyethylene chopped, three-inch long staple fibers (7 oz/yd$^2$). Each fabric ply is cut to have dimensions of 40 cm×40 cm and the plies are then stacked on each other coextensively and placed centrally between two 45 cm×45 cm steel plates covered with release paper and pressed under the same conditions as in Example 1. The resulting fabric product has closed gaps between the two styles of SPECTRA® fabric and also provides sufficient durability for using it as-is or for secondary processing, but the plies are not laminated, adhered or thermally fused to each other.

EXAMPLE 4

A single ply of the woven SPECTRA® S900 fabric of Example 1 is provided.

The ply is then stitched with yarn in a square pattern (1"×1" grid) with polyurethane segmented block fibers (LYCRA® brand, commercially available from DuPont of Wilmington, Del.). Also provided is one layer of linear low density polyethylene film having dimensions of 40 cm×40 cm. The woven fabric is cut to have dimensions of 40 cm×40 cm. Then the film and fabric are stacked on each other coextensively and placed centrally between two 45 cm×45 cm steel plates covered with release paper and pressed under the same conditions as in Example 1. The resulting fabric product has closed gaps between the fibers and also provides sufficient durability for using the fabric as-is or for secondary processing.

EXAMPLE 5

One ply of the woven SPECTRA® S900 fabric of Example 1 is provided. Also provided is one layer of a uni-directional, non-woven fabric comprising two cross-plied plies of 375 denier, SPECTRA® 1000 ultra-high molecular weight polyethylene fibers (cross-plied at 0°/90°). The two plies of the non-woven fabric are stitch bonded together with polyvinyl alcohol fibers and the combination has an areal density of 1.5 oz/yd$^2$. Each fabric is cut to have dimensions of 40 cm×40 cm and the plies are then stacked on each other coextensively and placed centrally between two 45 cm×45 cm steel plates covered with release paper and pressed under the same conditions as in Example 1. The resulting fabric product has closed gaps between the two styles of SPECTRA® fabric and also provides sufficient durability for using it as-is or for secondary processing, but the plies are not laminated, adhered or thermally fused to each other.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A fibrous material comprising:
    a first fibrous ply comprising a plurality of first multifilament elongate bodies, wherein immediately adjacent bodies of said first multifilament elongate bodies are not bonded or fused to each other and are able to move freely within the first fibrous ply, each of said first multifilament elongate bodies having a tenacity of at least about 7 g/denier and an initial tensile modulus of at least about 150 g/denier; and wherein said first multifilament elongate bodies comprise twisted fibers;
    a second fibrous ply on and coextensive with said first fibrous ply, said second fibrous ply comprising a plurality of second multifilament elongate bodies, wherein immediately adjacent bodies of said second multifilament elongate bodies are not bonded or fused to each other and are able to move freely within the second fibrous ply, each of said second multifilament elongate bodies having a tenacity of at least about 7 g/denier and an initial tensile modulus of at least about 150 g/denier; and
    wherein said second multifilament elongate bodies comprise twisted fibers;
        wherein said first fibrous ply and said second fibrous ply are not laminated to each other, adhesively bonded to each other with an adhesive, or thermally fused to each other, and wherein the first fibrous ply and the second fibrous ply are stitched together with at least a first set of threads, interconnecting the first fibrous ply with the second fibrous ply, said first set of threads comprising a plurality of third elongate bodies, and wherein each ply of said fibrous material is non-woven.

2. The fibrous material of claim 1 wherein each of said first multifilament elongate bodies consist essentially of first multifilament fibers having a cross-sectional aspect ratio ($1AR_f$) of at least 2:1 and each of said second multifilament elongate bodies consist essentially of second multifilament fibers having a cross-sectional aspect ratio (2AR) of at least 2:1.

3. The fibrous material of claim 2 wherein the third elongate bodies comprise third fibers and wherein each of said first multifilament fibers and said second multifilament fibers have a tenacity of at least twice the tenacity of the third fibers, and wherein each of said third fibers have an elongation to break of at least twice the elongation to break of said first multifilament fibers and said second multifilament fibers.

4. A fibrous material comprising:
    a first fibrous ply comprising a plurality of first multifilament elongate bodies, wherein immediately adjacent bodies of said first multifilament elongate bodies are not bonded or fused to each other and are able to move freely within the first fibrous ply, each of said first multifilament elongate bodies having a tenacity of at least about 7 g/denier and an initial tensile modulus of at least about 150 g/denier; and wherein said first multifilament elongate bodies comprise twisted fibers;
    a second fibrous ply on and coextensive with said first fibrous ply, said second fibrous ply comprising a plurality of second multifilament elongate bodies, wherein immediately adjacent bodies of said second multifilament elongate bodies are not bonded or fused to each other and are able to move freely within the second fibrous ply, each of said second multifilament elongate bodies having a tenacity of at least about 7 g/idenier and an initial tensile modulus of at least about 150 g/denier; and wherein said second multifilament elongate bodies comprise twisted fibers;
    wherein said first fibrous ply and said second fibrous ply are not laminated to each other, adhesively bonded to each other with an adhesive, or thermally fused to each other;
    wherein at least one of said first fibrous ply and said second fibrous ply is non-woven, or wherein at least one of said first fibrous ply and said second fibrous ply is woven;
    and wherein each of said first elongate bodies and each of said second elongate bodies are twisted multifilament fibers having at least about 0.5 twists per inch of fiber length up to about 15 twists per inch of fiber length.

5. A fibrous material comprising:
    a first fibrous ply comprising a plurality of first multifilament elongate bodies, wherein immediately adjacent bodies of said first multifilament elongate bodies are not bonded or fused to each other and are able to move freely within the first fibrous ply, each of said first multifilament elongate bodies having a tenacity of at least about7 g/denier and an initial tensile modulus of at least about 150 g/denier; and wherein said first multifilament elongate bodies comprise twisted fibers;
    a second fibrous ply on and coextensive with said first fibrous ply, said second fibrous ply comprising a plurality of second multifilament elongate bodies, wherein immediately adjacent bodies of said second multifilament elongate bodies are not bonded or fused to each other and are able to move freely within the second fibrous ply, each of said second multifilament elongate bodies having a tenacity of at least about 7 g/denier and an initial tensile modulus of at least about 150 g/denier; and wherein said second multifilament elongate bodies comprise twisted fibers;
    wherein said first fibrous ply and said second fibrous ply are not laminated to each other, adhesively bonded to each other with an adhesive, or thermally fused to each other; and wherein one of said first fibrous ply and said second fibrous ply is woven and one of said first fibrous ply and said second fibrous ply is non-woven.

6. The fibrous material of claim 1 wherein no gaps are present between adjacent first multifilament elongate bodies and wherein no gaps are present between adjacent second multifilament elongate bodies, and wherein said third elongate bodies are polyurethane fibers.

7. The fibrous material of claim 1 wherein said first multifilament elongate bodies comprise first multifilament fibrous tapes and wherein said second multifilament elongate bodies comprise second multifilament fibrous tapes, and wherein each of said first multifilament fibrous tapes and said second multifilament fibrous tapes have a tenacity of at least twice the tenacity of the third elongate bodies, and wherein each of said third elongate bodies have an elongation to break of at least twice the elongation to break of said first multifilament fibrous tapes and said second multifilament fibrous tapes.

8. A fibrous material comprising:
a first fibrous ply comprising a plurality of first multifilament elongate bodies, wherein at least some of said first multifilament elongate bodies are not bonded or fused to each other and are able to move freely within the first fibrous ply, each of said first multifilament elongate bodies having a tenacity of at least about 7 g/denier and an initial tensile modulus of at least about 150 g/denier;
a second fibrous ply on and coextensive with said first fibrous ply, said second fibrous ply comprising a plurality of second multifilament elongate bodies, wherein at least some of said second multifilament elongate bodies are not bonded or fused to each other and are able to move freely within the second fibrous ply, each of said second multifilament elongate bodies having a tenacity of at least about 7 g/denier and an initial tensile modulus of at least about 150 g/denier;
wherein said first fibrous ply and said second fibrous ply are not laminated to each other, adhesively bonded to each other with an adhesive, or thermally fused to each other; wherein each of said first multifilament elongate bodies comprise first multifilament fibers having a cross-sectional aspect ratio ($1AR_f$) of at least 2:1 and each of said second multifilament elongate bodies comprise second multifilament fibers having a cross-sectional aspect ratio ($2AR_f$) of at least 2:1; and wherein said First multifilament fibers are formed from first multifilament precursor fibers having an aspect ratio of $1AR_i$ and said second multifilament fibers are formed from second multifilament precursor fibers having an aspect ratio of $2AR_i$, wherein $1AR_f$ is at least two times $1AR_i$ and wherein $2AR_f$ is at least two times $2AR_i$.

9. A multilayer article comprising a plurality of the fibrous materials of claim 8, wherein the first fibrous ply and the second fibrous ply are stitched together with at least a first set of threads, thereby interconnecting the first fibrous ply with the second fibrous ply, said first set of threads comprising a plurality of third elongate bodies, said third elongate bodies comprising third fibers and wherein said third elongate bodies comprise polyurethane fibers, nylon 6 fibers, nylon 66 fibers, polyethylene terephthalate fibers, polyethylene naphthalate fibers, polybutylene terephthalate fibers, polytrimethylene terephthalate fibers, polypropylene fibers or polyvinyl alcohol fibers.

10. The fibrous material of claim 4 wherein atleast one of said first fibrous ply and said second fibrous ply is non-woven.

11. The fibrous material of claim 4 wherein at least one of said first fibrous ply and said second fibrous ply is woven.

12. The fibrous material of claim 4 wherein each of said first fibrous ply and said second fibrous ply is non-woven.

13. The fibrous material of claim 4 wherein each of said first fibrous ply and said second fibrous ply is woven.

14. The fibrous material of claim 8 wherein each of said first multifilament elongate bodies comprise first multifilament fibers having a cross-sectional aspect ratio ($1AR_f$) and each of said second multifilament elongate bodies comprise second multifilament fibers having a cross-sectional aspect ratio ($2AR_f$), and wherein said first multifilament fibers are formed from first multifilament precursor fibers having an aspect ratio of $1AR_i$ and said second multifilament fibers are formed from second multifilament precursor fibers having an aspect ratio of $2AR_i$, wherein $1AR_i$ is from about 1:1 to about 2:1 and $1AR_f$ is from about 2:1 to about 4:1, and wherein $2AR_i$ is from about 1:1 to about 2:1 and $2AR_f$ is from about 2:1 to about 4:1.

15. The fibrous material of claim 8 wherein each of said first multifilament elongate bodies comprise first multifilament fibers having a cross-sectional aspect ratio ($1AR_f$) and each of said second multifilament elongate bodies comprise second multifilament fibers having a cross-sectional aspect ratio ($2AR_f$), and wherein said first multifilament fibers are formed from first multifilament precursor fibers having an aspect ratio of $1AR_i$ and said second multifilament fibers are formed from second multifilament precursor fibers having an aspect ratio of $2AR_i$, wherein $1AR_f$ is at least five times $1AR_i$ and wherein $2AR_f$ is at least five times $2AR_i$.

16. The fibrous material of claim 8 wherein each of said first multifilament elongate bodies comprise first multifilament fibers having a cross-sectional aspect ratio ($1AR_f$) and each of said second multifilament elongate bodies comprise second multifilament fibers having a cross-sectional aspect ratio ($2AR_f$), and wherein said first multifilament fibers are formed from First multifilament precursor fibers having an aspect ratio of $1AR_i$ and said second multifilament fibers are formed from second multifilament precursor fibers having an aspect ratio of $2AR_i$, wherein $1AR_i$ is from about 1:1 to about 2:1 and $1AR_f$ is greater than about 10:1, and wherein $2AR_i$ is from about 1:1 to about 2:1 and $2AR_t$ is from greater than about 10:1.

17. The fibrous material of claim 8 wherein said first multifilament fibers and said second multifilament fibers comprise multifilament polyethylene fibers.

18. The fibrous material of claim 8 wherein said multifilament elongate bodies are not coated with a polymeric binder material, and wherein the fibrous material further comprises at least one additional fibrous ply wherein immediately adjacent bodies of said at least one additional fibrous ply are not bonded or fused to each other and are able to move freely within the at least one additional fibrous ply, and wherein all of said first fibrous ply, said second fibrous ply and said at least one additional fibrous ply are not laminated to each other, adhesively bonded to each other with an adhesive, or thermally fused to each other.

19. The fibrous material of claim 8 wherein each of said first multifilament elongate bodies comprise first multifilament fibrous tapes formed from said first multifilament elongate bodies and having a cross-sectional aspect ratio ($1AR_{ft}$) of at least 6:1 and each of said second multifilament elongate bodies comprise second multifilament fibrous tapes formed from said second multifilament elongate bodies and having a cross-sectional aspect ratio ($2AR_{ft}$) of at least 6:1, optionally wherein said first Multifilament fibrous tapes and said second multifilament fibrous tapes are formed from twisted multifilament fibers.

20. The fibrous material of claim 4 wherein each of said first elongate bodies and each of said second elongate bodies are twisted multifilament fibers having at least 11 twists per inch of fiber length up to about 15 twists per inch of fiber length.

* * * * *